United States Patent [19]
Kasten

[11] 4,199,292
[45] Apr. 22, 1980

[54] FORAGE WAGON REAR WALL CONSTRUCTION

[76] Inventor: John E. Kasten, 136 Concord La., West Bend, Wis. 53095

[21] Appl. No.: 935,998

[22] Filed: Aug. 23, 1978

[51] Int. Cl.² ............................................. B60P 1/36
[52] U.S. Cl. ..................................... 414/519; 192/29; 192/71; 296/56; 296/152
[58] Field of Search .................... 296/56, 152, 137 B; 414/502–505, 519, 528, 526; 192/29, 71, 48.7, 82 R, 129 R

[56] References Cited

U.S. PATENT DOCUMENTS

| | | | |
|---|---|---|---|
| 3,272,358 | 9/1966 | Thompson | 414/528 |
| 3,275,176 | 9/1966 | Kasten | 414/502 |
| 3,300,068 | 1/1967 | Tarrant | 414/528 |
| 4,068,769 | 1/1978 | Sweet | 414/519 |

*Primary Examiner*—Philip Goodman
*Attorney, Agent, or Firm*—Michael, Best & Friedrich

[57] ABSTRACT

A forage wagon includes an interior storage area having a rear access opening. An endless belt conveyor assembly is carried within the interior storage area and includes a rear drive gear mechanism mounted along the rear access opening. The forage wagon further includes an access door hingedly mounted on the rear access opening and movable between an open and closed position. The access door includes an inside surface area facing toward the interior storage area, an outside surface area facing away from the interior storage area and an integral baffle assembly attached to the inside surface area and adapted to enclose the rear drive gear mechanism when the access door is in the closed position. The forage wagon includes spring means for biasing the access door to the open position while permitting movement of the access door to the closed position, and a locking mechanism comprising an outer locking member mounted along the outside surface area and operative for locking the door in the closed position, an outer latching member mounted on the outside surface area and operative to restrain the outer locking member and prevent accidental unlocking of the access door from outside the interior storage area, and an inner latching member mounted on the inside surface area and operative to unlock the access door from inside the interior storage area.

17 Claims, 6 Drawing Figures

FORAGE WAGON REAR WALL CONSTRUCTION

BACKGROUND OF THE INVENTION

This invention relates to forage wagon construction, and more particularly, to forage wagons having hingedly attached rear doors. The invention represents a further development of the forage wagons disclosed in U.S. Pat. Nos. 3,047,174; 3,223,264; 3,275,176; 3,276,554; and 3,572,811.

Forage wagons having interior storage areas carrying endless conveyor mechanisms and including rear access doors are known. It is desirable to be able to securely lock the rear access door. However, when the rear access door is locked closed, it is possible for the stored forage material to envelop and become entangled with the conveyor mechanism in the vicinity of the rear access door, causing mechanical jams and equipment failures. It is foreseeable that an operator may, in such event, climb into the interior of the wagon for manual unloading thereof. Under such circumstances, it is desirable to provide means operable from the inside to open the rear door.

SUMMARY OF THE INVENTION

The invention provides a forage wagon having a wheeled frame and spaced walls on the frame enclosing an interior storage area. At least one of the walls is hingedly attached to the frame, providing an access door movable between an open position permitting access into the interior storage area and a closed position blocking the access. The access door includes an outside surface area facing away from the interior storage area and an inside surface area facing toward the interior storage area. The forage wagon further includes a locking mechanism for the access door comprising an outer locking member, an outer latching member and an inner latching member. The outer locking member is mounted along the outside surface area and rotatable relative thereto about a primary axis of rotation between an unlocked position, in which the access door is freely movable between the open and closed positions, and a locked position in which the access door is maintained by the outer locking member in the closed position. The outer latching member is mounted outwardly of the outside surface area and rotatable relative thereto about a secondary axis of rotation extending transversely of the primary axis between a latched position and an unlatched position. The inner latching member is mounted on the inside surface area and axially movable along the secondary axis between a first position and a second position. The locking mechanism further includes first means for maintaining the outer locking member in the locked position when the outer latching member is disposed in the latched position while permitting free movement of the outer locking member between the locked and unlocked positions when the outer latching member is disposed in the unlatched position, and second means for holding the outer latching member in a close non-touching relationship relative to the outside surface area when the inner latching member is disposed in the first position and for holding the outer latching member in an outwardly spaced relationship relative to the outside surface area when the inner latching member is disposed in the second position. By virtue of this construction, when the outer latching member is in the unlatched position, the outer locking member is freely operable between the locked and unlocked positions regardless of the disposition of the inner latching member, and when the outer latching member is in the latched position, the outer locking member is maintained in the locked position when the inner latching member is disposed in the first position and is movable to the unlocked position in response to movement of the inner latching member from the first to the second position.

In accordance with one embodiment of the invention, the forage wagon includes spring means connected to the frame and to the access door and operative for holding the access door in the open position while permitting movement of the access door to the closed position. In this embodiment the outer locking member is operative in the locked position for maintaining the access door in the closed position, notwithstanding the spring means, and operative in the unlocked position to permit movement of the access door from the closed to the open position in response to action of the spring means.

In accordance with another embodiment of the invention, the forage wagon includes a front end portion and a rear end portion. In this embodiment, the sidewalls are attached between the front and rear end portions, a discharge auger occupies the front end, and the access opening occupies the rear end. The forage wagon further includes an endless conveyor assembly carried within the interior storage area and operative for conveying forage material in the interior storage area to the discharge auger. The conveyor assembly includes a rear drive gear mechanism mounted transversely of and adjacent to the access opening. In this embodiment, the access door includes an integral baffle assembly having a top wall and adjacent sidewalls extending from and connected to the inside surface area thereby enclosing a chamber having an open bottom. The baffle assembly is adapted to enclose the rear drive gear mechanism in the chamber when the access door is in the closed position, thereby shielding the rear drive gear mechanism from contact with the forage material.

In accordance with the preferred embodiment, the spring means comprises an air activated spring mechanism. The access door and the access opening both include opposite side edges and upper and lower edges, and the upper edge of the access door is hingedly attached to the upper edge of the access opening. In this embodiment, the locking mechanism comprises a pair of locking eyes which are mounted in opposed and generally aligned relationship on the side edges of the access opening generally intermediate the upper and lower edges thereof. A locking shaft is carried by the outside surface area and rotatable relative thereto, which locking shaft includes opposite end portions generally coterminous with the side edges of the access door and in general proximity to the locking eyes when the access door is in the closed position. The locking mechanism further includes a pair of locking appendages, one of which locking appendages is affixed to each of the opposite end portions and movable, in response to rotation of the locking shaft when the access door is in the closed position between an engaged position with the proximate locking eye, thereby maintaining the access door in the closed position, and a disenagaged position with the proximate locking eye, whereby the door is movable from the closed to the open position in response to action of the spring means. Handle means is provided for rotating the locking shaft between the engaged and disengaged position, and the handle means includes a latching slot. An integral latching arm is included having oppositely spaced first and second end portions, the first end portion being adapted to be slidably received by an aperture in the door and extending from the inside surface area, and the second end portion being adapted to extend from the outside surface area. The second end portion is movable in response to axial movement of the first end portion relative to the aperture between a close, non-touching relationship with the outside surface area and an outwardly spaced relationship with the outside surface area. The second end portion further includes a hooked-end portion and a handle arm extending generally perpendicularly from the hooked-end portion and operative for rotating the integral latching arm relative to the aperture between a latched position, in which the hooked-end portion is received by the latching slot, and an unlatched position, in which the hooked-end portion is free of the latching slot. By virtue of this construction, when the integral latching arm is in the unlatched position, the locking shaft is freely operable by the handle means between the engaged and disengaged positions regardless of the axial disposition of the second end portion relative to the outside surface area. When the integral latching arm is in the latched position, the locking shaft is maintained in the engaged position when the second end portion is in the close, non-touching relationship relative to the outside surface area and movable to the disengaged position in response to axial movement of the second end portion from the close, non-touching relationship to the outwardly spaced relationship with the outside surface area.

Also in accordance with the preferred embodiment, the locking mechanism further includes pin means adapted to be removably received by the first end portion of the integral latching arm and operative for preventing axial movement of the second end portion from the close, non-touching relationship to the outwardly spaced relationship to the outside surface area. In this embodiment, the locking means includes lower edge locking means connected to the locking shaft and operative for securing the lower edge of the access door along the lower edge of the access opening frame when the locking shaft is disposed in the engaged position.

One of the principal features of the invention is the provision of a hingedly attached rear door for a forage wagon, which door includes a locking mechanism which securely locks the door in the closed position to prevent accidental opening thereof from ouside the forage wagon, while at the same time permitting unlocking and opening the door from inside the forage wagon.

Another of the principal features of the invention is the provision of a hingedly attached rear door for a forage wagon, which door includes a protective baffle assembly adapted to shield the rear gear drive assembly of the conveyor assembly from contact with forage material when the door is in the closed position.

Still another of the principal features of the invention is the provision of a hingedly attached rear door for a forage wagon, which rear door includes spring means for holding the door in the open position while permitting closing of the door and which spring means is operative for automatically moving the door from the closed to the open position whenever the locking mechanism is moved from the locked to the unlocked position.

Other features and advantages of the embodiments of the invention will become apparent upon reviewing the following general description, drawings, and the appended claims.

Before explaining one embodiment of the invention in detail, it is to be understood that the invention is not limited to its application to the details of construction and arrangement of parts set forth in the following description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Figure 1:
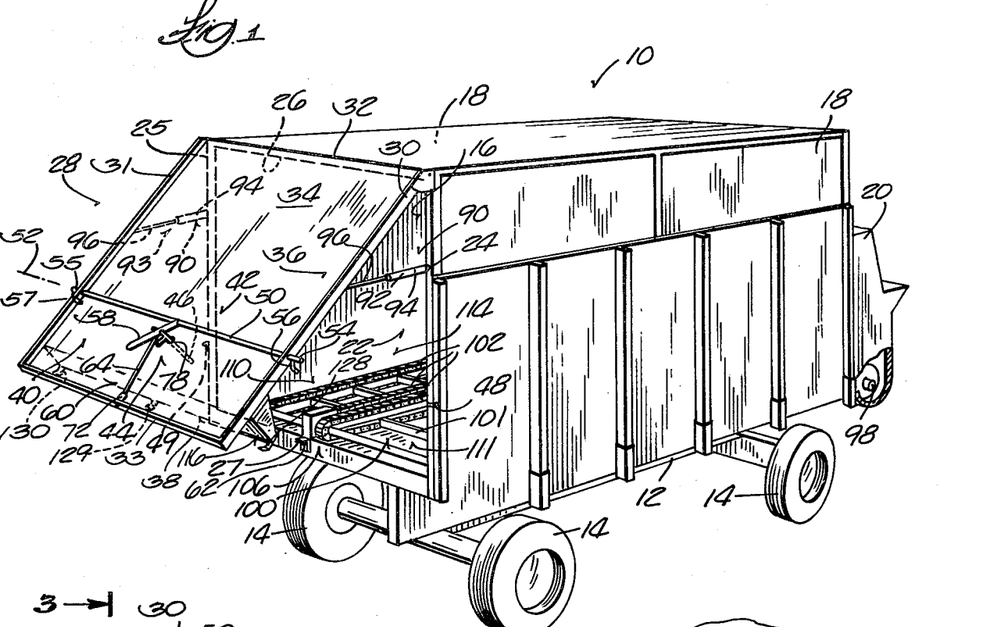
FIG. 1 is a perspective and partially fragmentary rear view of a forage wagon having a rear access door which embodies various of the features of the invention.

Shown in FIG. 1 is a farm wagon 10, conventionally described as a forage wagon, which includes a frame 12 mounted on wheels 14 for movement over the ground. Typically, the wagon 10 is not self-propelled, but is towed behind a tractor or other prime mover (not shown). The wagon 10 includes an interior storage area 16 which is partially enclosed by a pair of oppositely spaced sidewalls 18 and a mechanical forage discharge mechanism 20. As illustrated, the forage discharge mechanism 20 occupies the front or towed end portion of the frame 12.

The forage wagon 10 thus includes an access opening 22 leading into the storage area 16, which access opening 22 occupies the back or rear end portion of the frame 12 oppositely spaced from the mechanical forage discharge mechanism 20. The access opening 22 is defined by opposed side frame edges 24 and 25 and upper and lower frame edges 26 and 27.

As it is desirable to be able to completely seal off the interior storage area 16; the forage wagon 10 includes an end wall 28 having opposite side edges 30 and 31 and upper and lower edges 32 and 33. The end wall 28 is hingedly attached along its upper edge 32 to the upper frame edge 26 of the access opening 22. An access door 34 is thus defined having a outside surface area 36 facing away from the interior storage area 16 and an inside surface area 38 facing toward the interior storage area 16. The access door 34 is hingedly movable between an open position (shown in FIG. 1) which permits entry into the interior storage area 16 and a closed position (shown in FIGS. 2 and 4) which blocks entry and thereby seals off the interior storage area 16.

The forage wagon 10 includes a locking mechanism 40 for the access door 34. Generally, the locking mechanism 40 includes an outer locking member 42 mounted along the outside surface area 36 and operative to securely lock the access door 34 in the closed position, an outer latching member 44 mounted outwardly of the outside surface area 36 and operative to restrain the outer locking member 42 and prevent accidental unlocking of the access door 34 from outside the interior storage area 16, and an inner latching member 46 mounted on the inside surface area 38 and operative to permit unlocking of the access door 34 from inside the interior storage area 16.

Figure 2:
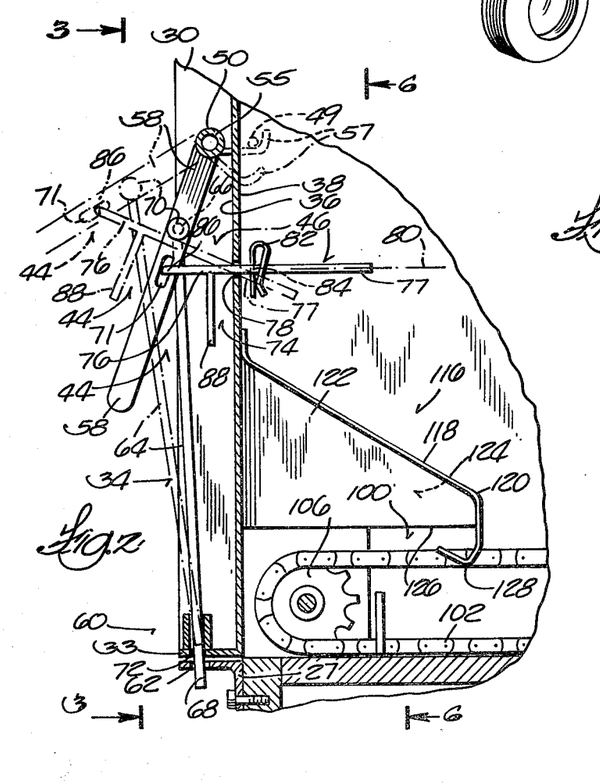
FIG. 2 is a partial and fragmentary side view of the access door shown in FIG. 1 in which the access door is shown in the closed and locked position.
Figure 4:
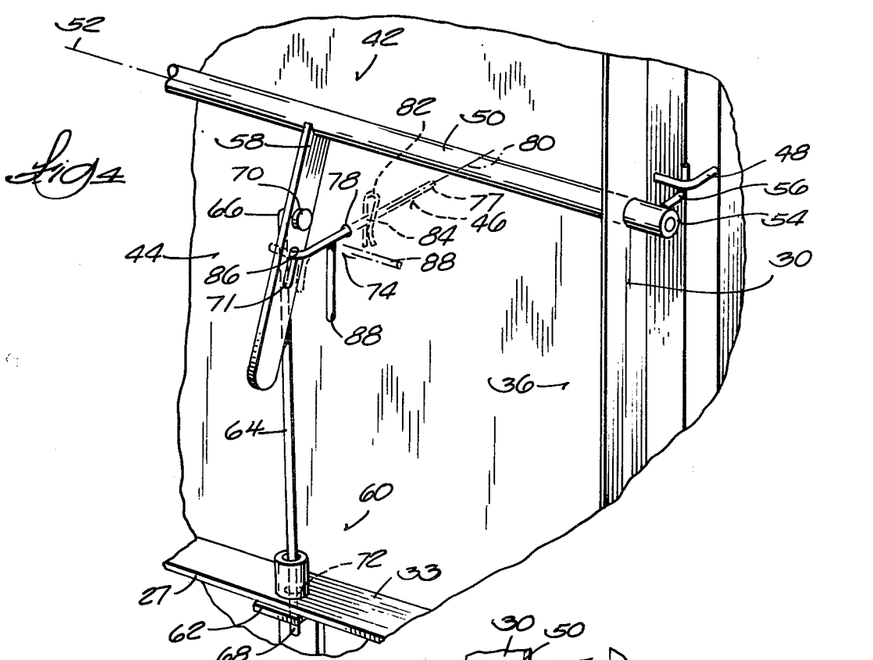
FIG. 4 is an exploded perspective view of the outer locking and latching members shown in FIGS. 2 and 3.

Referring first to the construction and operation of the outer locking member 42 (as best seen in FIGS. 1, 2 and 4), a pair of locking eyes 48 and 49 is mounted in opposed and generally aligned relationship on the side frame edges 24 and 25 of the access opening 22 and positioned generally intermediate the upper and lower edges 26 and 27 thereof. A locking shaft 50 is carried by the outside surface area 36 of the access door 34 and is rotatable relative thereto about an axis of rotation hereafter referred to as the primary axis of rotation 52. The locking shaft 50 includes opposite end portions 54 and 55 which are generally coterminous with the side edges 30 and 31 of the access door 34 and positioned to be in general proximity to the locking eyes 48 and 49 when the access door 34 is disposed in the closed position.

Figures 5, 6:
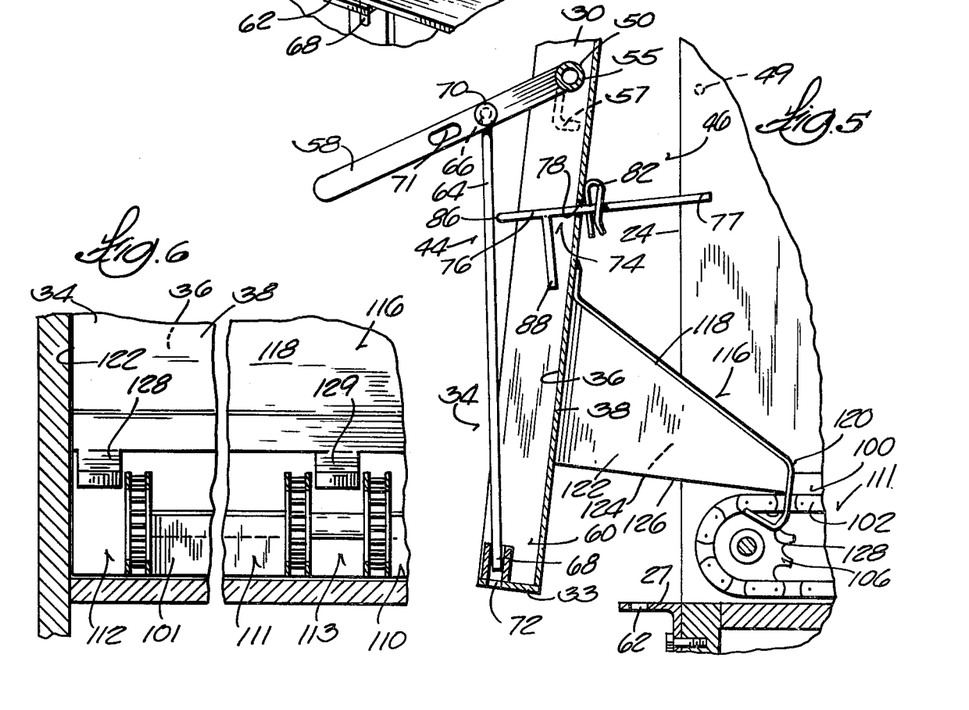
FIG. 5 is a partial and fragmentary side view of the access door similar to FIG. 2, except the door is shown in the unlocked and partially opened position.
FIG. 6 is a sectional view of the access door taken generally along line 6—6 of FIG. 2.

The outer locking member 42 further includes a pair of locking appendages or fingers 56 and 57 affixed to the opposite end portions 54 and 55. The locking apppendages 56 and 57 are movable in response to rotation of the locking shaft 50 when the access door 34 is in the closed position between an engaged position with the proximate locking eyes 48 and 49 (as shown in solid lines in FIG. 2 and in FIG. 4), in which the access door 34 is mechanically prevented by the outer locking member 42 from moving to the open position (as shown in solid lines in FIG. 2 and FIG. 4), and a disengaged position with the proximate locking eyes 48 and 49 (as shown in phantom lines in FIG. 2), in which the access door 34 is freely movable between the closed and open positions (as best shown in FIG. 5). A handle 58 is affixed to the locking shaft 50 and operative to permit manual rotation of the locking appendages 56 and 57 between the engaged and disengaged positions (as best shown in FIG. 2).

The locking mechanism 40 can also include a lower edge locking means 60 operatively connected to the locking shaft 50 for securing the lower edge 33 of the access door 34 along the lower frame edge 27 of the access opening 22 when the locking shaft 50 is disposed in the locked position. The lower edge locking means 60 thus prevents "bowing out" of the access door 34.

Figure 3:
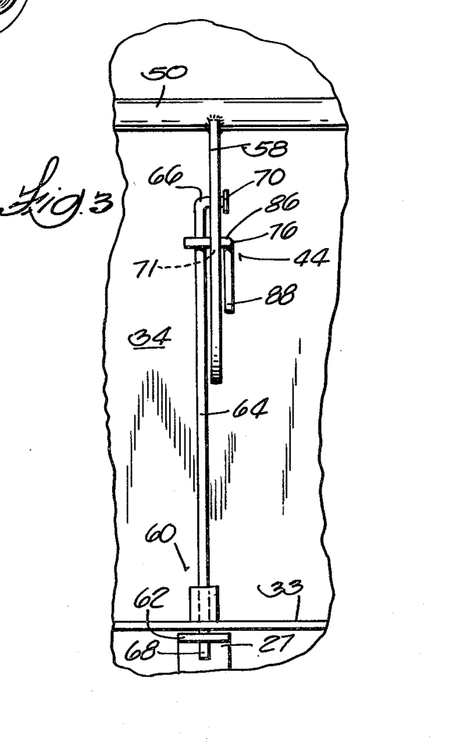
FIG. 3 is a partial sectional view of the access door taken generally along line 3—3 of FIG. 2, showing the outer locking and latching members.

While the lower edge locking means 60 can be variously constructed, in the illustrated embodiment, a lower locking eye 62 is affixed to the lower frame edge 27 of the access opening 22 generally intermediate the side frame edges 24 and 25. An upstanding locking bar 64 includes an upper end 66 and a lower end 68, and is pivotally connected at the upper end 66 through an aperture 70 in the handle 58. The lower end 68 extends through a hole 72 in the lower edge 33 of the access door 34 and is slidably movable therethrough in response to movement of the handle 58. When the handle 58 is disposed so as to place the locking shaft 50 in the locked position, the lower end 68 of the locking bar 64 is received within the lower locking eye 62 (as shown in solid lines in FIG. 2 and also in FIGS. 3 and 4), thus restraining the lower edge 33 of the access door 34.

When the handle 58 is disposed so as to place the locking shaft 50 in the unlocked position, the lower end 68 of the locking bar 64 is upwardly withdrawn from engagement within the lower locking eye 62 (as shown in phantom lines in FIG. 2 and in FIG. 5) and frees the lower edge 33 of the access door 34.

While the inner and outer latching members 44 and 46 may be variously constructed, in the illustrated embodiment, an integral latching arm 74 is provided (as best shown in FIGS. 2, 4, and 5) having opposite end portions 76 and 77 which correspond, respectively, to the outer latching member 44 and the inner latching member 46.

The access door 34 includes an aperture 78 along a secondary axis 80 which is generally transverse the primary axis 52 (FIG. 4). The integral latching arm 74 is adapted to be slidably received by and rotatable relative to the aperture 78, with the inner latching member 46 disposed so as to extend outwardly from the inside surface area 38 and the outer latching member 44 disposed so as to extend outwardly of the outside surface area 36.

As before described, the integral latching arm 74 is both axially movable along and rotatably relative to the secondary axis 80. Referring first to the axial movement, the inner latching member 46 is slidably movable within the aperture 78 between a first position (shown in solid lines in FIG. 2 and also in FIG. 4) in which the outer latching member 44 is held in a close, non-contiguous or non-touching relationship relative to the outside surface area 36 and a second position (shown in phantom lines in FIG. 2) in which the outer latching member 44 is held in an outwardly spaced relationship relative to the outside surface area 36.

In the illustrated embodiment, the locking mechanism 40 includes pin means, such as a cotter pin 82, which fits through a hole 84 located in the inner latching member 46. When the cotter pin 82 is positioned in the hole 84, it physically maintains the inner latching member 46 in the first position, preventing axial movement of the inner latching member 46 to the second position. Because of this construction, removal of the cotter pin 82 by a person located inside the interior storage area 16 is necessary before axial movement of the outer latching member 44 from the close, non-touching relationship to the outwardly spaced relationship can be made.

Referring next to the rotatable movement of the integral latching arm 74, the outer latching member 44 includes a hooked-end portion 86 and a handle arm 88 extending generally perpendicularly from the hooked-end portion 86. The handle arm 88 is operative to permit manual rotation of the integral latching arm 74, and thus the hooked-end portion 86, relative to the aperture 78. As can be seen in FIG. 4, the hooked-end portion 86 is operable to be rotated into and out of latching engagement with a latching slot 71 by moving the handle arm 88. As should be apparent, the cotter pin 82 has no effect upon the rotatable movement of the latching arm 74.

When the hooked-end portion 86 is out of latching engagement with the latching slot 71 (shown in phantom lines in FIG. 4 and in FIG. 5) the handle 58 of the locking shaft 50 is free to rotate the locking shaft 50 between the locked and unlocked position. As should now be apparent, when the hooked-end portion 86 is rotatably out of latching engagement with the latching slot 71, the axial disposition of the integral latching arm 74 within the aperture 78 is of no operative consequence.

However, by placing the locking shaft 50 in the locked position and rotating the hooked-end portion 86 into latching engagement with the latching slot 71, the axial disposition of the integral latching arm 74 has definite operational consequences. First, when the cotter pin 82 is in place and the outer latching member 44 is thereby held in its close, non-contiguous relationship, the latching engagement physically restrains movement of the handle 58 and the locking shaft 50 is maintained in the locked position (as best shown in solid lines in FIG. 2 and also in FIG. 4). Accidental movement of the handle 58 is prevented, and only deliberate operator participation, such as rotatable movement by the operator of the hooked-end portion 86 out of latching engagement with the latching slot 71, is effective to permit handle 58 movement.

Should a person become trapped inside the interior storage area 16 when the locking shaft 50 is in the locked and latched positions as just described, axial movement of the integral latching arm 74 has a second operative effect. Removal of the cotter pin 82 permits movement of the inner latching member 46 from the first to the second position by the person trapped inside the interior storage area 16. As is best shown in phantom lines in FIG. 2, when the inner latching member 46 is thusly moved, the outer latching member 44 is moved from the close, non-contiguous relationship to the outwardly spaced relationship, and by virtue of the latching engagement between the hooked-end portion 86 and the latching slot 71, the handle 58 is also simultaneously moved, thereby rotating the locking shaft 50 from the locked to the unlocked position. The access door 34 is then movable from the closed to the open position.

To further facilitate the movement of the access door 34 from the closed to the open positions, and thereby facilitate opening of the access door 34 from both within and without the interior storage area 16, spring means 90 is provided for holding, and in effect biasing, the access door 34 in the open position while permitting movement of the access door 34 to the closed position. With the provision of the spring means 90, the locking shaft 50 is operative in its locked position to maintain the access door 34 in the closed position, despite the reaction of the spring means 90, and in its unlocked position to permit automatic movement of the access door 34, without manual assistance, from the closed to the open position in response to the action of the spring means 90.

While the spring means 90 can be variously constructed and take the form of, for example, a conventional tensile spring assembly, in the illustrated embodiment shown in FIG. 1, a pair of conventional air spring mechanisms 92 and 93 are utilized, each having a closed cylinder end 94 confining a finite volume of air and a piston arm end 96 to which a piston head (not shown) is attached. The cylinder end 94 is attached to the side frame edges 24 and 25 of the access opening 22 and the piston arm end 96 is attached to the side edges 30 and 31 of the access door 34. Each air spring mechanism 92 and 93 has a normal, or extended, position as shown in FIG. 1 in which the piston arm 96 extends outwardly of the cylinder 94, and biases the access door 34 to the open position. Each air spring 92 and 93 also has a compressed or contracted position (not shown) created when the access door 34 is closed, thereby moving the piston head in the air cylinder 94 and generating a head of pressure through the compression or trapping of the air contained within the cylinder 94. Unless opposed, such as when the locking shaft 50 is disposed in the locked position, the trapped air will seek expansion and drive the piston head, and thus the piston arm 96, back to the normal position. The air springs 92 and 93 are thereby operative in tandem to automatically move the access door 34 from the closed to the open position whenever the locking shaft 50 is moved from the locked to the unlocked position.

As was heretofore described, the forage wagon 10 includes the mechanical forage discharge mechanism 20. Typically, the discharge mechanism 20 includes a transverse discharge auger 98 and an endless conveyor mechanism 100 carried within the interior storage area 16 and having a plurality of generally spaced flights 101 which engage and carry the forage in the interior storage area 16 to the discharge auger 98. In this assembly, the conveyor 100 is driven by laterally spaced sprocket chains 102 which are carried by a forward sprocket gear drive assembly (not shown) and a rear sprocket gear assembly 106 (See FIGS. 2, 5 and 6). The forward sprocket gear drive assembly is operatively connected to an external power source (not shown), such as the power take-off mechanism of a tractor, through a suitable clutch assembly (also not shown).

When the interior storage area 16 is loaded with forage, the access door 34 being closed and locked, the forage material can contact and eventually envelop the rear sprocket gear assembly 106. Should the belt conveyor 100 be operated, it is possible for the forage material to become entangled with the rear sprocket gear assembly 16, causing mechanical jams and, ultimately, mechanical damage.

The rear sprocket gear assembly 106 is shielded from contact with forage material when the access door 34 is closed. Specifically, as can best be seen in FIG. 6, the conveyor mechanism 100 includes a pair of conveyors 110 and 111 which are operatively connected for common movement by the front and rear sprocket 106 gear assemblies. The pair of conveyors 110 and 111 is located in spaced relationship relative to each other and to the sidewalls 18 so as to provide three interval areas 112, 113, 114 (best seen in FIG. 6). Two of the interval areas 112 and 114 are located between the respective sidewalls 18 and the adjacent belt conveyor 110 and 111, and the third interval area 113 is located intermediate the pair of conveyors 110 and 111.

The access door 34 includes a protective baffle assembly 116 integral with the inside surface area 38 and extending partially into the interior storage area 16. While the baffle assembly 116 can take various forms, in the illustrated embodiment, a downwardly slanted baffle top wall 118 having a bottom leading edge 120 is provided. Baffle sidewalls 122 are attached to the top wall 118 and to the inside surface area 38 thereby defining an enclosed chamber 124 (see also FIGS. 2 and 5) having a bottom opening 126 located in general proximity to the lower edge 33 of the access door 34. Three support legs 128, 129, and 130 extend downwardly from the bottom opening 126 and are connected to the bottom leading edge 120. The three support legs 128, 129, and 130 are movable in the respective interval areas 112, 113, and 114 as the access door 34 is being moved between the closed and open positions, thereby holding the leading edge 120 out of contact with the flights 101 and thus not interfering with the operation of either of the belt conveyors 110 and 111. As can best be seen in FIGS. 2 and 6, when the access door 34 is in the closed position, any forage material present in the interior storage area 16 is prevented from contacting the rear sprocket gear assembly 106 which is shielded within the enclosed chamber 124. Entanglement of forage with the rear sprocket gear assembly 106 is thereby prevented when the access door 34 is in the closed position.

Various of the features of the invention are set forth in the following claims.

What is claimed is:

1. A forage wagon having a wheeled frame, spaced walls on said frame and enclosing an interior storage area, at least one of said walls being hingedly attached to said frame providing an access door movable between an open position permitting access into said interior storage area and a closed position blocking said access, said access door including an outside surface area facing away from said interior storage area and an inside surface area facing toward said interior storage area, and a locking mechanism for said access door comprising an outer locking member mounted along said outside surface area and rotatable relative thereto about an axis of primary rotation between an unlocked position in which said access door is freely movable between said open and closed positions and a locked position in which said access door is maintained by said outer locking member in said closed position, an outer latching member mounted outwardly of said outside surface area and rotatable relative thereto about an axis of secondary rotation extending transversely of said primary axis between a latched position and an unlatched position, an inner latching member mounted on said inside surface area and axially movable along said secondary axis between a first position and a second position, first means for maintaining said outer locking member in said locked position when said outer latching member is disposed in said latched position while permitting free movement of said outer locking member between said locked and unlocked positions when said outer latching member is disposed in said unlatched position, second means for holding said outer latching member in a close non-touching relationship relative to said outside surface area when said inner latching member is disposed in said first position and for holding said outer latching member in an outwardly spaced relationship relative to said outside surface area when said inner latching member is disposed in said second position, and whereby, when said outer latching member is in said unlatched position, said outer locking member is freely operable between said locked and unlocked positions regardless of the disposition of said inner latching member, and when said outer lachting member is in said latched position, said outer locking member is maintained in said locked position when said inner latching member is disposed in said first position and movable to said unlocked position in response to movement of said inner latching member from said first to said second position.

2. A forage wagon according to claim 1 wherein said locking mechanism further includes pin means adapted to be removably received by said inner latching member and operative for preventing movement of said inner latching member from said first to said second position when said pin means is received by said inner latching member.

3. A forage wagon according to claim 1 further including an access opening frame having side edges, wherein said access door includes side edges and is hingedly mounted on said access opening frame, and said outer locking member includes a pair of locking eyes, one of said locking eyes mounted in opposed and generally aligned relationship on each of said side edges of said access opening frame, a locking shaft carried by said outside surface area and rotatable relative to said primary axis, said locking shaft including opposite end portions generally coterminous with said side edges of said access door and in general proximity to said locking eyes when said access door is in said closed position, a pair of locking appendages, one of said locking appendages affixed to each of said opposite end portions and movable in response to rotation of said locking shaft when said access door is in said closed position between an engaged position with said proximate locking eye, thereby defining said locked position of said outer locking member, and a disengaged position with said proximate locking eye, thereby defining said unlocked position of said outer locking member, handle means for rotating said locking shaft between said locked and unlocked positions, and slot means on said handle means and cooperative with said first means for maintaining said locking shaft in said locked position when said outer latching member is disposed in said latched position while permitting free movement of said locking shaft between said locked and unlocked positions when said outer latching member is disposed in said unlatched position.

4. A forage wagon according to claim 3 wherein both said access door and said access opening frame include upper and lower edges, wherein said upper edge of said access door is hingedly attached to said upper edge of said access opening frame, said locking shaft and said pair of locking eyes are located generally intermediate said upper and lower edges, and wherein said outer locking member further includes lower edge locking means connected to said locking shaft and operative for securing said lower edge of said access door along said lower edge of said access opening frame when said locking shaft is disposed in said locked position.

5. A forage wagon according to claim 1 wherein said second means includes an aperture in said access door disposed along said secondary axis, wherein said outer latching member and said inner latching member comprise an integral latching arm having oppositely spaced first and second end portions, said first end portion being adapted to be slidably received by said aperture and extend from said inside surface area, thereby comprising said inner latching member, said second end portion being adapted to extend outwardly of said outside surface area, thereby comprising said outer latching member, said second end portion further includes a hooked-end portion and a handle arm extending generally perpendicularly from said hooked-end portion and operative for axially rotating said integral latching arm relative to said secondary axis when said first end portion is received by said aperture, and said first means comprises said hooked-end portion and further includes slot means on said outer locking member being operative for receiving said hooked-end portion in response to axial rotation of said integral latching arm by said handle arm, thereby defining said latched position, while permitting disengagement with said hooked-end portion in response to subsequent axial rotation of said integral latching arm by said handle arm, thereby defining said unlatched position.

6. A forage wagon having a wheeled frame, spaced walls attached to said frame and defining an interior storage area, said frame including a rear access opening leading into said interior storage area and having opposed side edges and upper end lower edges, an end wall having opposed side edges and upper and lower edges, said upper edge of said end wall being hingedly attached to said upper edge of said access opening providing an access door movable between an open position permitting access into said interior storage area and a closed position blocking said access, said access door including an outside surface area facing away from said interior storage area and an inside surface area facing toward said interior storage area, an aperture through said access door between said outside and inside surface areas, and a locking mechanism for said access door comprising a pair of locking eyes, one of said locking eyes mounted in opposed and generally aligned relationship on each of said side edges of said access opening generally intermediate said upper and lower edges thereof, a locking shaft carried by said outside surface area and rotatable relative thereto, said locking shaft including opposite end portions generally coterminous with said side edges of said access door and in general proximity to said locking eyes when said access door is in said closed position, a pair of locking appendages, one of said locking appendages being affixed to each of said opposite end portions and movable in response to rotation of said locking shaft when said access door is in said closed position between an engaged position with said proximate locking eye, in which said access door is maintained in said closed position, and a disengaged position with said proximate locking eye, in which said door is freely movable between said open and closed positions, handle means for rotating said locking shaft between said engaged and disengaged positions, said handle means including a latching slot, an integral latching arm having oppositely spaced first and second portions, said first portion being adapted to be slidably received by said aperture and extend from said inside surface area, said second end portion being adapted to extend outwardly of said outside surface area and movable in response to axial movement of said first end portion relative to said aperture between a close, non-touching relationship with said outside surface area and an outwardly spaced relationship with said outside surface area, said second end portion further including a hooked-end portion and a handle arm extending generally perpendicularly from said hooked-end portion and operative for rotating said integral latching arm relative to said aperture when said first end portion is received therein between a latched position in which said hooked-end portion is received by said latching slot and an unlatched position in which said hooked-end portion is free of said latching slot, and whereby, when said integral latching arm is in said unlatched position, said locking shaft is freely operable by said handle means between said engaged and disengaged positions regardless of the axial disposition of said second end portion relative to said outside surface area, and when said integral latching arm is in said latched position, said latching shaft is maintained in said engaged position when said second end portion is in said close, non-touching relationship relative to said outside surface area and movable to said disengaged position in response to axial movement of said second end portion from said close, non-touching relationship to said outwardly spaced relationship with said outside surface area.

7. A forage wagon according to claim 6 wherein said locking mechanism further includes pin means adapted to be removably received by said first end portion of said integral latching arm and operative for preventing axial movement of said second end portion from said close, non-touching relationship to said outwardly spaced relationship with said outside surface area.

8. A forage wagon according to claim 7 wherein said locking mechanism further includes lower edge locking means connected to said locking shaft and operative for securing said lower edge of said access door along said lower edge of said access opening frame when said locking shaft is disposed in said engaged position.

9. A forage wagon having a wheeled frame, spaced walls on said frame and enclosing an interior storage area, at least one of said sidewalls being hingedly attached to said frame providing an access door movable between an open position permitting access into said interior storage area and a closed position blocking said access, spring means connected to said frame and said door and operative for biasing said access door to said open position, a locking mechanism operative between a locked position, in which said door maintained in said closed position notwithstanding said spring means, and an unlocked position, in which said door is movable from said closed to said open position in response to said spring means.

10. a forage wagon according to claim 9 wherein said spring means includes a closed cylinder confining a finite volume of air when said access door is in said open position a piston movable in said cylinder and operative for compressing said finite volume of air in response to movement of said door from said open to said closed position, said piston further operative for moving said access door from said closed to said open position in response to expansion of said compressed air within said closed cylinder.

11. A forage wagon according to claim 10 wherein said access door includes an outside surface area facing away from said interior storage area and an inside surface area facing toward said interior storage area, wherein said locking mechanism is carried by said outside surface area and rotatable relative thereto about an axis of primary rotation between said locked and said unlocked positions, wherein said forage wagon further includes an outer latching member mounted outwardly of said outside surface area and rotatable relative thereto about an axis of secondary rotation extending transversely of said primary axis between a latched position and an unlatched position, an inner latching member mounted on said inside surface area and axially movable along said secondary axis between a first position and a second position, first means for maintaining said locking mechanism in said locked position when said outer latching member is disposed in said latched position while permitting free movement of said locking mechanism between said locked and unlocked positions when said outer latching member is disposed in said unlatched position, second means for holding said outer latching member in a close, non-touching relationship relative to said outside surface area when said inner latching member is disposed in said first position and for holding said outer latching member in an outwardly spaced relationship relative to said outside surface area when said inner latching member is disposed in said second position, and whereby, when said outer latching member is in said unlatched position, said locking mechanism is freely operable between said locked and unlocked positions regardless of the disposition of said inner latching member, and when said outer latching member is in said latched position, said locking mechanism is maintained in said locked position when said inner latching member is disposed in said first position and movable to said unlocked position in response to movement of said inner latching member from said first to said second position.

12. A forage wagon according to claim 11, wherein said forage wagon includes a forward end portion and a rear end portion, and wherein said access door is hingedly attached at said rear end portion.

13. A forage wagon for transporting forage material and including a wheeled frame having a forward end portion and a rear end portion, said frame including spaced sidewalls between said forward and said rear end portions, a discharge auger mounted on said front end, an interior storage area partially defined by said sidewalls and said discharge auger and having an access opening located at said rear end portion, an endless conveyor assembly carried within said interior storage area and operative for conveying forage material in said interior storage area to said discharge auger, said conveyor assembly including a rear dirve gear mechanism mounted transversely of and adjacent to said access opening, and an access door hingedly mounted on said frame for movement between a closed position blocking said access opening and an open position permitting access into said interior storage area, said access door including an inside surface area facing toward said interior storage area, and said access door further including an integral baffle assembly having a top wall and adjacent sidewalls extending from and connected to said inside surface area and enclosing a chamber having an open bottom, said baffle assembly being adapted to enclose said rear drive gear mechanism in said chamber when said access door is in said closed position thereby shielding said rear drive gear mechanism from contact with the forage material.

14. A forage wagon according to claim 13 wherein said access door includes an outside surface area facing away from said interior storage area and wherein said forage wagon further includes a locking mechanism for said access door comprising an outer locking member mounted along said outside surface area and rotatable relative thereto about an axis of primary rotation between an unlocked position, in which said access door is freely movable between said open and closed positions, and a locked position, in which said access door is maintained by said outer locking member in said closed position, an outer latching member mounted outwardly of said outside surface area and rotatable relative thereto about an axis of secondary rotation extending transversely of said primary axis between a latched position and an unlatched position, an inner latching member mounted on said inside surface area and axially movable along said secondary axis between a first position and a second position, first means for maintaining said outer locking member in said locked position when said outer latching member is disposed in said latched position while permitting free movement of said outer locking member between said locked and unlocked positions when said outer latching member is disposed in said unlatched position, second means for holding said outer latching member in a close, non-touching relationship relative to said outside surface area when said inner latching member is disposed in said first position and for holding said outer latching member in an outwardly spaced relationship relative to said outside surface area when said inner latching member is disposed in said second position, and whereby, when said outer latching member is in said unlatched position, said outer locking member is freely operable between said locked and unlocked positions regardless of the disposition of said inner latching member, and when said outer latching member is in said latched position, said outer locking member is maintained in said locked position when said inner latching member is disposed in said first position and movable to said unlocked position in response to movement of said inner latching member from said first to said second position.

15. A forage wagon for transporting forage material and including a wheeled frame having a forward end portion and a rear end portion, spaced sidewalls attached to said frame between said forward and said end portions, a discharge auger mounted on said forward end, an interior storage area partially defined by said sidewalls and said discharge auger and having an access opening located at said rear end portion, said access opening having opposed side edges and upper and lower edges, an endless conveyor assembly carried in said interior storage area and operative for conveying forage material in said interior storage area to said discharge auger, said conveyor assembly including a rear drive gear mechanism mounted transversely of and adjacent to said access opening, an end wall having opposed side edges and upper and lower edges, said upper edge of said end wall being hingedly attached to said upper edge of said access opening providing an access door movable between an open position permitting access into said interior storage area and a closed position blocking said access, said access door including an outside surface area facing away fron said interior storage area and an inside surface facing toward said interior storage area, an aperture through said access door between said outside and inside surface areas, an integral baffle assembly having a top wall and adjacent sidewalls extending from and connected to said inside surface area and enclosing a chamber having an open bottom, said baffle assembly being adapted to enclose said rear drive gear mechanism in said chamber when said access door is in said closed position thereby shielding said drive gear mechanism from contact with the forage material, spring means connecting at least one of said side edges of said access opening with a corresponding number of said side edges of said access door and operative for biasing said access door at said open position, and a locking mechanism for said access door comprising a pair of locking eyes, one of said locking eyes mounted in opposed and generally aligned relationship on each of said side edges of said access opening generally intermediate said upper and lower edges thereof, a locking shaft carried by said outside surface area and rotatable relative thereto, said locking shaft including opposite end portions generally coterminous with said side edges of said access door and in general proximity to said locking eyes when said access door is in said closed position, a pair of locking appendages, one of said locking appendages affixed to each of said opposite end portions and movable in response to rotation of said locking shaft when said access door is in said closed position between an engaged position with said proximate locking eye in which said access door is maintained in said closed position and a disengaged position with said proximate locking eye in which said door is movable from said closed to said open position in response to said spring means, handle means for rotating said locking shaft between said engaged and disengaged positions, said handle means including a latching slot, an integral latching arm having oppositely spaced first and second end portions, said first end portion being adapted to be slidably received by said aperture and extend from said inside surface area, said second end portion being adapted to extend outwardly of said outside surface area and movable in response to axial movement of said first end portion relative to said aperture between a close, non-touching relationship with said outside surface area and an outwardly spaced relationship with said outside surface area, said second end portion further including a hooked-end portion and a handle arm extending generally perpendicularly from said hooked-end portion and operative for rotating said integral latching arm relative to said aperture when said first end portion is received therein between a latched position in which said hooked-end portion is received by said latching slot and an unlatched position in which said hooked-end portion is free of said latching slot, and whereby, when said integral latching arm is in said unlatched position, said locking shaft is freely operable by said handle means between said engaged and disengaged positions regardless of the axial disposition of said second end portion relative to said outside surface area, and when said integral latching arm is in said latched position, said locking shaft is maintained in said engaged position when said second end portion is in said close, non-touching relationship relative to said outside surface area and movable to said disengaged position in response to axial movement of said second end portion from said close, non-touching relationship to said outwardly spaced relationship with said outside surface area.

16. A forage wagon according to claim 15 wherein said locking mechanism further include pin means adapted to be removably received by said first end portion of said integral latching arm and operative for preventing axial movement of said second end portion from said close, nontouching relationship to said outwardly spaced relationship with said outside surface area.

17. A forage wagon according to claim 16 wherein said locking mechanism further includes lower edge locking means connected to said locking shaft and operative for securing said lower edge of said access door along said lower edge of said access opening frame when said locking shaft is disposed in said engaged position.

* * * * *